US005330206A

United States Patent [19]

Krumszyn et al.

[11] Patent Number: 5,330,206

[45] Date of Patent: Jul. 19, 1994

[54] ADAPTER FOR POWER TOOLS

[75] Inventors: Luba M. Krumszyn, 125 The Crossway, Yonkers, N.Y. 10701; Zinovi Khabal, Yonkers, N.Y.

[73] Assignee: Luba Krumszyn, Yonkers, N.Y.

[21] Appl. No.: 136,908

[22] Filed: Oct. 18, 1993

[51] Int. Cl.[5] .............................................. B23B 51/12

[52] U.S. Cl. ............................... 279/144; 408/239 A

[58] Field of Search ............................... 279/143–145; 408/239 A

[56] References Cited

U.S. PATENT DOCUMENTS 3,973,784 8/1976 Smith .......................... 408/239 A X
4,944,641 7/1990 Alves .............................. 279/144 X
5,015,129 5/1991 Albin .............................. 279/143 X
5,110,145 5/1992 Stewart ........................... 279/145 X
5,129,118 7/1992 Walmesley ................. 408/239 A X
5,180,261 1/1993 Schreiber ........................ 279/145 X

*Primary Examiner*—Steven C. Bishop
*Attorney, Agent, or Firm*—Charles E. Baxley

[57] ABSTRACT

An apparatus for adapting drill bits and similar tools to a power tool includes a drive shaft which includes a threaded end portion which is connected to a chuck. An intermediate portion of the drive shaft supports a pair of ball bearings which are located in a first cavity, formed in a collar which encircles the drive shaft. The drive shaft has a second end portion which projects into a second cavity formed in the collar. The second cavity includes a threaded portion for connection to a power tool and the second end portion has a hexagonal cross-section.

4 Claims, 1 Drawing Sheet

ADAPTER FOR POWER TOOLS

BACKGROUND OF THE INVENTION

This invention relates generally to the field of power tools and, more particularly, to an adapter for power tools to convert a power tool from one use to another.

The prior art related to power tool adapters includes the following apparatus.

U.S. Pat. No. 3,585,719 to S. E. Kivela shows an adapter which converts the rotary motion of a power source into a reciprocating motion. A tool holder is provided as part of this apparatus to hold a saw blade.

U.S. Pat. No. 4,082,475 to A. W. Kuder shows an adapter for a coaxial drive fastener gun which includes a planetary gear set and which is capable of driving a high speed reamer.

U.S. Pat. No. 4,312,610 to A. D. Burt shows an adapter which utilizes a cam to convert the rotary motion of a hand-held drill to combine reciprocating and rotary motion for the purpose of driving a sheet metal cutting tool.

U.S. Pat. No. 4,924,578 to K. C. Chagnon, et al. shows an adapter for converting a rotary power tool such as a rotary screw gun to a rotary cutter for cutting gypsum wall board. The adapter includes a plurality of rotatable gears and shafts to enable the cutting bit to turn at a speed preferably six times greater than the speed of the screw driving bit of the screw gun.

U.S. Pat. No. 4,949,463 to Y. Chen shows an adapter which utilizes a spiral gear set and an eccentric strut to convert the rotary motion of a hand-held drill to reciprocating motion in order to operate a saw blade.

U.S. Pat. No. 4,972,589 to R. W. Povieski shows an attachment for a rotary drill which utilizes a drive shaft and a gear set to drive a circular saw or power sander.

The apparatus in the prior art utilizes relatively complex gear drives and is directed to conversion of rotary motion into reciprocating motion for driving saw blades or to modification of the speed of the input motion in order to drive reamers or cutter tools.

OBJECTS AND SUMMARY OF THE INVENTION

It is an object of the present invention to provide an adapter for power tools which is capable of adapting a power screw driver tool to drive various size drill bits.

Another object of the present invention is to provide an adapter which is capable of adapting a hex drive power tool to a drill bit.

Another object of the present invention is to provide an adapter for power tool which incorporates a collar which can be grasped in a safe manner during operation.

Yet another object of the present invention is to provide an adapter for power tools which includes a relatively small number of component parts resulting in reliable long-term operation.

In accordance with the present invention there is provided an adapter for power tools which includes a drive shaft, one end of which has a hexagonal cross-sectional shape which is adapted for insertion into the operating portion of a power tool such as a power screw driver. The opposite end of the drive shaft is connected to a chuck which is capable of accepting and driving a range of drill bits. An intermediate portion of the drive shaft supports a pair of bearings. A generally cylindrical collar member is mounted on the bearings. The drive shaft can rotate freely relative to the collar member, thereby enabling an operator to grasp the adapter close to the location of the chuck in a safe manner during operation.

DESCRIPTION OF THE DRAWINGS

Other important objects and advantages of the present invention will be apparent from the following detailed description, taken in connection with the accompanying drawings, in which.

DETAILED DESCRIPTION OF THE INVENTION

Figure 1:
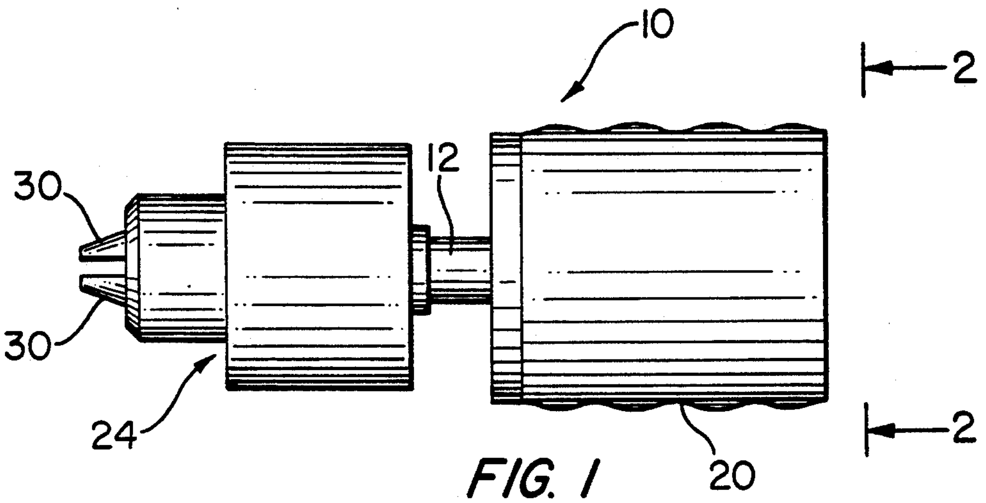
FIG. 1 is a side elevational view of the adapter for power tools of the present invention.
Figure 3:
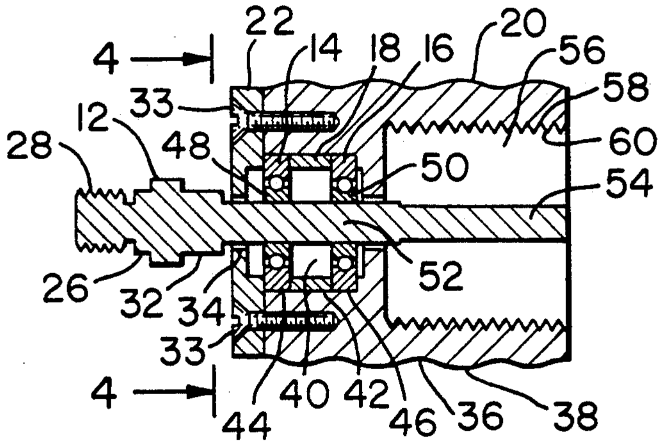
FIG. 3 is a cross-sectional view taken along the line 3—3 of FIG. 2.

With reference to the drawings, there is shown in FIGS. 1-4 an adapter for a power tool 10, made in accordance with the present invention, which includes a drive shaft 12, a pair of ball bearings 14, 16, a spacer 18, a collar 20, a cap 22 and a chuck assembly 24.

The drive shaft 12 includes a first portion 26 which has a threaded portion 28 which is adapted for engaging and driving the chuck assembly 24. The chuck assembly 24 is conventional in nature and will therefore not be described in detail other than to indicate that the chuck assembly 24 includes a plurality of jaws 30 for driving drill bits or other tool bits.

Figure 4:
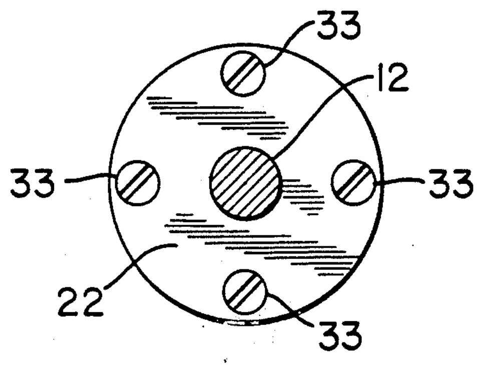
FIG. 4 is a view taken along the line 4—4 of FIG. 3.

An intermediate portion 32 of the drive shaft 12 forms a shoulder portion against which the cap 22 abuts. The cap 22 is connected to the collar 20 by four screws 33 which are shown in FIG. 4. The drive shaft 12 passes through a central hole 34 in the cap 22 and the drive shaft 12 is free to rotate relative to the cap 22.

An outer surface 36 of the collar 20 has a plurality of rounded protrusions 38 which facilitate grasping of the collar 20 by an operator. The collar 20 includes a first cavity 40, a wall 42 of which is in contact with outer races 44, 46 of the ball bearings 14, 16, and the cylindrical spacer 18 disposed between the outer races 44, 46 of the ball bearings 14, 16. Inner races 48, 50 of the ball bearings 14, 16 support an intermediate portion 52 of the drive shaft 12 which is circular in cross-section and the collar 20 and cap 22 can rotate freely relative to the drive shaft 12.

Figure 2:
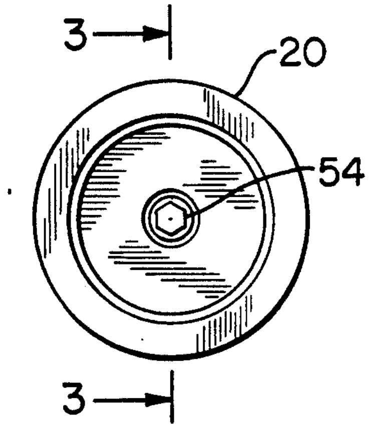
FIG. 2 is an end view taken along the line 2—2 of FIG. 1.

An end portion 54 of the drive shaft 12 projects into a second cavity 56 which is formed in the collar 20. A wall 58 of the second cavity 56 has a thread 60 formed thereon which is adapted for connection to a power tool. The end portion 54 of the drive shaft 12 is hexagonal in cross-section as is shown in FIG. 2 for the purpose of forming a driving connection with the power tool.

The foregoing specific embodiment of the present invention, as set forth in the specification herein, is for illustrative purposes only. Various changes and modifications may be made within the spirit and scope of this invention.

What is claimed is:

1. An adapter for power tools comprising: a generally cylindrical drive shaft having a first end, a second end, and an intermediate portion, with said second end including at least one flat portion for forming a driving connection with a power tool; a pair of bearings mounted on said intermediate portion of said drive shaft; chuck means for driving a tool bit, with said chuck means connected to said first end of said drive shaft; and a collar member encircling said drive shaft, with said collar member having a first cavity portion enclosing said pair of bearings, and with said collar member capable of rotating relative to said drive shaft; with said collar member having a second cavity portion and with said second end of said drive shaft projecting into said second cavity; a cap member having a central aperture through which said drive shaft passes; and connection means connecting said cap member and said collar member for rotation of said cap member with said collar member, with said cap member disposed to cover said first cavity portion of said collar member.

2. An adapter for power tools according to claim 1, in which said collar member has a plurality of rounded projection portions.

3. An adapter for power tools according to claim 1, in which said connection means connecting said cap member and said collar member comprises a plurality of screws.

4. An adapter for power tools according to claim 1, in which said second cavity portion of said collar further comprises a threaded portion.

* * * * *